United States Patent
Krishnan

(10) Patent No.: US 12,515,394 B2
(45) Date of Patent: Jan. 6, 2026

(54) METHOD FOR FACILITATING DEMOLDING UPON PATTERN TRANSFER

(71) Applicant: OBDUCAT AB, Lund (SE)

(72) Inventor: Prasanna Venkatesh Krishnan, Lund (SE)

(73) Assignee: OBDUCAT AB, Lund (SE)

( * ) Notice: Subject to any disclaimer, the term of this patent is extended or adjusted under 35 U.S.C. 154(b) by 170 days.

(21) Appl. No.: 18/549,312

(22) PCT Filed: Mar. 5, 2022

(86) PCT No.: PCT/EP2022/055653
§ 371 (c)(1),
(2) Date: Sep. 6, 2023

(87) PCT Pub. No.: WO2022/189313
PCT Pub. Date: Sep. 15, 2022

(65) Prior Publication Data
US 2024/0165870 A1     May 23, 2024

(30) Foreign Application Priority Data
Mar. 10, 2021   (EP) .................................... 21161882

(51) Int. Cl.
*B29C 59/00*  (2006.01)
*B29C 59/02*  (2006.01)
*B29K 23/00*  (2006.01)
*B29K 25/00*  (2006.01)
(Continued)

(52) U.S. Cl.
CPC .......... *B29C 59/002* (2013.01); *B29C 59/026* (2013.01); *G03F 7/0002* (2013.01);
(Continued)

(58) Field of Classification Search
CPC ............ B29K 2023/38; B29K 2025/06; B29K 2067/003; B29K 2069/00;
(Continued)

(56) References Cited

U.S. PATENT DOCUMENTS

2009/0321990 A1* 12/2009 Heidari ................. G03F 7/0002
                                                 425/436 RM
2011/0085949 A1   4/2011 Roy et al.
2012/0000379 A1*  1/2012 Greener ................. B82Y 40/00
                                                 101/27

FOREIGN PATENT DOCUMENTS

JP         S57102316 A    6/1982

OTHER PUBLICATIONS

International Search Report and Written Opinion for corresponding Application No. PCT/EP2022/055653, issued on May 27, 2022.
(Continued)

*Primary Examiner* — Xiao S Zhao
*Assistant Examiner* — Victoria Bartlett
(74) *Attorney, Agent, or Firm* — Renner, Otto, Boisselle & Sklar, LLP

(57) ABSTRACT

A method for facilitating demolding of a substrate from an imprint template, the method comprising: providing (S510) the template and the substrate in a sandwich arrangement with a structured surface of the template in contact with a target surface of the substrate; applying heat (S520) to soften a molding layer on the target surface, wherein said molding layer is a thermoplastic material having a minimum glass transition temperature, $T_g>50°$ C. and Young's modulus>1000 MPa, and wherein the molding layer is heated above $T_g$; pressing (S530) the sandwich arrangement together to imprint a pattern of the structured surface into the heated molding layer; submerging (S550) the sandwich arrangement in a cooling liquid to harden the molding layer; and separating (S560) the template from the patterned substrate.

20 Claims, 4 Drawing Sheets

(51) Int. Cl.
  B29K 67/00   (2006.01)
  B29K 69/00   (2006.01)
  B29K 105/00  (2006.01)
  G03F 7/00    (2006.01)

(52) U.S. Cl.
  CPC ...... *B29K 2023/38* (2013.01); *B29K 2025/06* (2013.01); *B29K 2067/003* (2013.01); *B29K 2069/00* (2013.01); *B29K 2105/0085* (2013.01); *B29K 2995/0012* (2013.01); *B29K 2995/0077* (2013.01)

(58) Field of Classification Search
  CPC .... B29K 2105/0085; B29K 2995/0012; B29K 2995/0077; B29C 59/002; B29C 59/026; G03F 7/0002
  See application file for complete search history.

(56) References Cited

OTHER PUBLICATIONS

Chen-Chieh, et al: "Nanoimprint technology for patterning functional materials and its applications", Microelectronic Engineering, Elsevier Publishers BV., Amsterdam, NL, vol. 132, Oct. 23, 2014 (Oct. 23, 2014), pp. 98-119, XP029100136, ISSN: 0167-9317, DOI: 10.1016/J.MEE.2014.10.015.

Roy, et al. "Prototyping of microfluidic systems using a commercial thermoplastic elastomer", Microfluidics and Nanofluidics, Springer, Berlin, DE, vol. 11, No. 3, Mar. 26, 2011 (Mar. 26, 2011), pp. 235-244, XP019936131 ISSN: 1613-4990, DOI: 10.1007/S10404-011-0789-2.

* cited by examiner

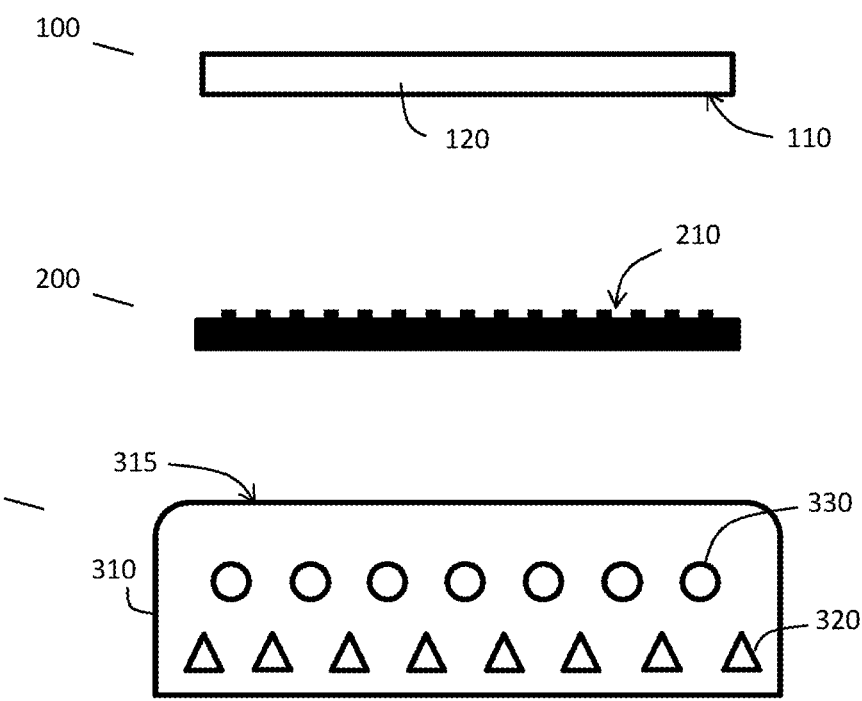
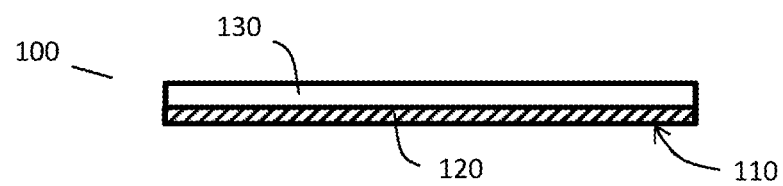
Fig. 1A
Fig. 1B
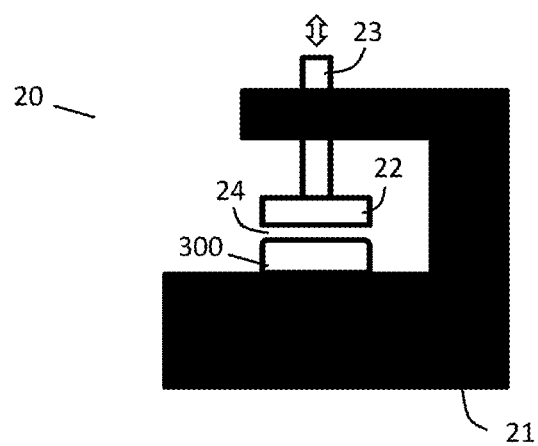
Fig. 2

METHOD FOR FACILITATING DEMOLDING UPON PATTERN TRANSFER

This application is a national phase of International Application No. PCT/EP2022/055653 filed Mar. 5, 2022, which claims priority to European Patent Application No. 21161882.2 filed Mar. 10, 2021, each of which is hereby incorporated herein by reference in its entirety.

TECHNICAL FIELD

The present disclosure relates to the field of pattern transfer, wherein a structured surface of a template is brought into contact with a moldable layer of a target surface of a substrate. Specifically, the solutions relate to methods where heat is applied in the pattern transfer process. The proposed solutions may e.g. be employed in imprint lithography.

BACKGROUND

One of the most powerful techniques for reproducing nanostructures—i.e. structures in the order of 100 nm or smaller—is nanoimprint lithography (NIL). In nanoimprint lithography an inverted copy of the surface pattern of a template is transferred into an object, comprising a substrate having a moldable surface layer. In this context, the substrate may be entirely formed of a moldable material. Alternatively, the substrate may comprise a carrier body onto which the moldable layer, often called a resist, is applied. In some processes, the moldable layer comprises a photo-resist material, i.e. a material which is sensitive to radiation. An example is a polymer or a pre-polymer which is cured into a polymer by cross-linking upon exposure to e.g. ultraviolet (UV) radiation. This requires that either the substrate or the stamp is transparent to the applied radiation.

In many types of pattern transfer, including some which employ radiation-sensitive materials, heat is used in the pattern transfer process, such as to soften or liquify the moldable layer. The patterned surface of the template is placed in contact with the moldable layer, such that the template and the substrate form a sandwich arrangement. After heating to a suitable temperature, such as above a glass transition temperature of a polymer material of the moldable layer, the template is pressed towards the moldable layer such that an imprint of the template pattern is formed or embossed in the moldable layer. This is followed by cooling, so as to solidify the imprinted moldable layer, before dismembering of the template from the substrate. Further post processing of the patterned substrate may take place.

In such an imprint process, the template and the substrate, or at least the moldable layer, are made of different materials. This also means that the heat coefficient of these materials may be quite different, such that the relative expansion or contraction between the molding step temperature and the temperature at which the dismantling of the substrate takes place, may be different. In certain applications, this means that cooling and dismantling are sensitive steps. This may e.g. be the case where the material forming either the template surface pattern, or the imprinted solidified moldable layer, or both, are brittle, and/or when the surface structure is at a fine scale such as in the nanometer region. Dismantling at a maintained elevated temperature may also cause damage in the moldable layer, at which the formed pattern structures are still soft.

For these reasons, cooling may be carried out at a controlled rate. Moreover, handling of the sandwich material at the elevated molding step temperature, normally well over 100 degrees Celsius, is typically problematic. The sandwich arrangement is therefore normally allowed to cool down before being removed from the imprint machine passed forward for dismantling. As a result, the imprint process is a time-consuming process.

SUMMARY

An object behind the solutions proposed herein is thus to provide a more efficient imprint process. According to one aspect, this is provided by the method as outlined in the independent claims. Advantageous embodiments are set out in the dependent claims.

According to one aspect, the proposed solution provides a method for transferring a pattern of a structured surface of a template onto a target surface of a substrate, comprising:
providing the template and the substrate into an imprint machine, in a sandwich arrangement with the structured surface in contact with the target surface; applying heat to soften a molding layer on the substrate surface;
pressing the sandwich arrangement together to imprint the pattern into the heated molding layer;
submerging the sandwich arrangement in a cooling liquid to harden the molding layer; and
separating the template from the patterned substrate.

By means of the proposed solution, a more efficient overall imprint process is obtained.

Various advantages are obtained with the proposed solution, within the categories of tool design, process design and industrialization.

In terms of tool Design, the demands on precision heating systems, which traditionally have to be considered, can be overlooked or simplified to just maintain desired temperatures without the need to loop between heating and cooling as in a regular process of polymer molding. The need for a cooling system is eliminated along with complex heater designs. Since the sandwich is heated to a temperature above the Tg (glass transition) of the polymer, lower pressures can be used for processing, reducing the demands on gas pressure delivery as well.

With regard to process design, robustness of the process is improved without the need for extensive process development for different types of patterns.

By far the biggest impact is associated with industrialization, as the proposed solution will reduce the total process time due to dispensing with the need for thermal cycling and accurate temperature control. This facilitates the adoption of the proposed solution into a high-volume manufacturing environment along with the robustness of the process and simpler machine designs.

BRIEF DESCRIPTION OF THE DRAWINGS

Embodiments of the invention will be described in more detail below, with reference to the accompanying drawings, on which:

FIG. 1A illustrate a substrate, a template, and an imprint support member usable for controlling temperature during an imprint process;

FIG. 1B illustrates an alternative embodiment of a substrate, usable in the proposed methods, wherein a moldable layer is applied to a carrier body;

FIG. 2 schematically illustrates an imprint apparatus in which various steps associated with the proposed solution may be carried out;

DETAILED DESCRIPTION

Figure 3A:
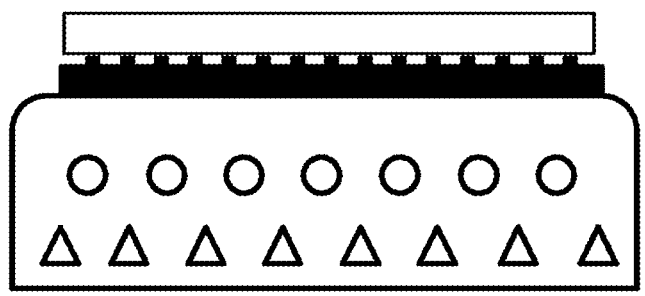
FIGS. 3A-3D illustrate different steps of an imprint process.

The term imprint process as used herein refers to a process for the creation of an inverted copy of a surface pattern of a template or stamp, which is generated by pressing the stamp into a moldable layer, such as a polymer or prepolymer, in order to deform the layer. The proposed solutions may advantageously be used for imprint of structures on the nanometer or micrometer scale.

FIG. 1A schematically illustrates various elements that may be involved in an imprint process. It shall be noted, though, that other elements may typically also be involved, some of which will be mentioned in reference, but which do not form part of the substantial elements of the proposed solution.

The object of the imprint process is to create a structured pattern of intended shape and dimension in the surface of an object. Herein, this object is referred to as a substrate 100, and is illustrated as a substantially flat sheet or disc. However, it shall be noted that other shapes of the substrate are plausible, e.g. with a curved surface.

The substrate 100 has a target surface 110, onto which the pattern is to be created. The target surface 110 forms a moldable layer 120, in which the pattern may be formed. In the example of FIG. 1A, the substrate has an integral structure, in which the entire substrate 100 is made of the same material. The moldable layer 120 may thus be seen as a surface layer part of the substrate 100, e.g. defined as a portion stretching from the target surface 110 of the substrate down to a certain depth into the bulk of the substrate 100.

As an alternative, shown in FIG. 1B, the moldable layer 120 may be provided as a coating on a carrier element 130. The application of the moldable layer 120 as a separate layer may be carried out in a separate prior process, or immediately before the imprint process. Various examples of material types usable in the proposed method will be described in various places below.

The template 200 is a master which has a structured surface 210. The shape of the structures in the surface 210 are formed as an inverse of the intended pattern to be created on the substrate 100. The template 200 may be of any material which remains solid in the temperatures at which the imprint process may take place. As mere examples, the template may be made of a metal, glass, a transparent crystal material etc. In various embodiments, the template 300 may be made of a flexible material, such as a polymer.

A temperature-regulated support element 300 may be used in an imprint process of the proposed method. The support element 300 may serve as a direct support to the template or the substrate during the imprint process. The support element 300 may thus serve as a counter element for providing pressure when the template 200 and the substrate 100 are pressed together in the imprint apparatus. The support element may comprise, or be connected to, a heating element 320. The heating element may e.g. comprise an electric heating mechanism, with heating electrodes incorporated in or connected to the support element 300. In operation, heat may be provided by means of the heating element 320, so as to elevate the temperature of the support element 300 in a controlled manner. Moreover, the support element 300 may optionally comprise a cooling element 330, such as ducts for a cooling fluid, formed in the support element 300.

FIG. 2 schematically illustrates an imprint apparatus 20, in which an imprint process may be carried out. The imprint apparatus may comprise a frame structure 21, which holds or supports the support element 300 at an imprint position. A pressure member 22 is suspended adjacent the support element 300, and is connected to the frame structure 21 such that the pressure member 22 and the support member 300 may be displaced away from each other for loading of a substrate 100 and a template 200 in an imprint position 24. The pressure member 24 may subsequently be operated to apply pressure during the imprint process, so as to press the substrate 100 and the template together. The imprint apparatus may further comprise a control mechanism (not shown) for controlling heating and cooling of the support element 300 during the imprint process, and for controlling the applied pressure.

FIGS. 3A-3D schematically illustrate various steps carried out in an imprint process according to the state of the art.

In FIG. 3A, the substrate 100 and the template 200 are placed together in a sandwich arrangement and placed at the support element 300. While these drawings show the substrate 100 on top of the template 200, the opposite arrangement may alternatively be used in some embodiments.

Figure 3B:
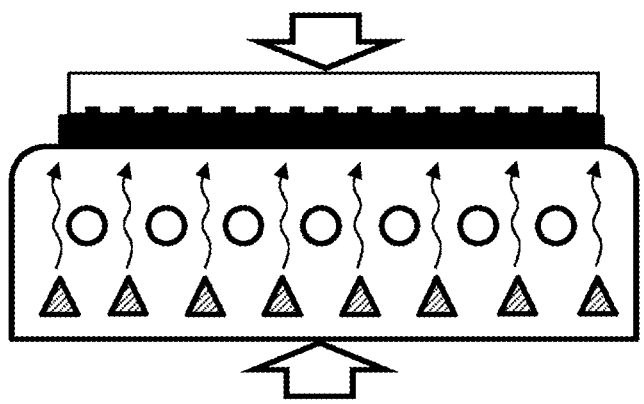

In FIG. 3B heat is applied using the heating element 320. In this process, the moldable layer of the substrate 100 may be affected to soften. Where the moldable layer of the substrate 100 is a thermoplastic polymer, heating may be carried out to exceed a exceed a glass transition temperature Tg of the thermoplastic polymer of the substrate 100. As indicated by the arrows in the drawing, pressure is further applied such that the structure of the patterned template surface 210 is embossed in the moldable substrate layer of the substrate 100, so as to make an imprint of the pattern.

Figure 3C:
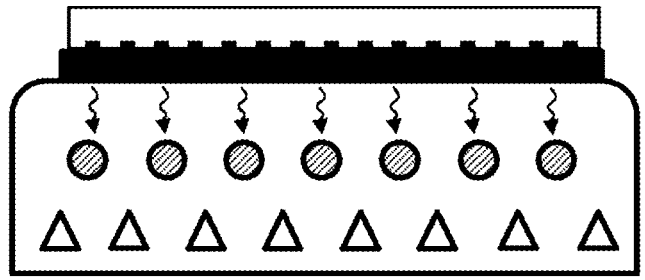

In FIG. 3C, the cooling element 330 is operated to cool down the entire sandwich arrangement of the substrate 100 and the template 200. This may be carried out while maintaining pressure, so as to ensure that the intended pattern transfer is obtained. Where the moldable layer of the substrate 100 is a thermoplastic polymer, cooling may be carried out until a temperature T<Tg or lower is reached.

Figure 3D:
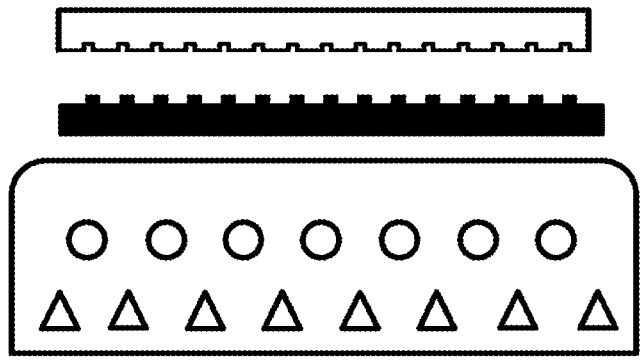

FIG. 3D schematically illustrates that, after cooling, the sandwich arrangement may be taken out from the imprint position, and dismembered.

FIGS. 4A-4E schematically illustrate various steps of an imprint process according to the proposed solution. Herein, the process steps carried out in FIGS. 4A and 4B may be similar to the process steps of FIGS. 3A and 3B.

The substrate 100 may include a thermoplastic polymer and is placed in contact with the patterned surface 210 of the template 200, in a sandwich arrangement. This may be carried out prior to placing the sandwich arrangement in contact with the support element 300 in the imprint machine 20. The substrate 100 may be entirely formed of the thermoplastic material, or the thermoplastic material 120 may be a coating provided on a carrier element 130, wherein the carrier element 130 may be formed of a different material.

Figure 4A:
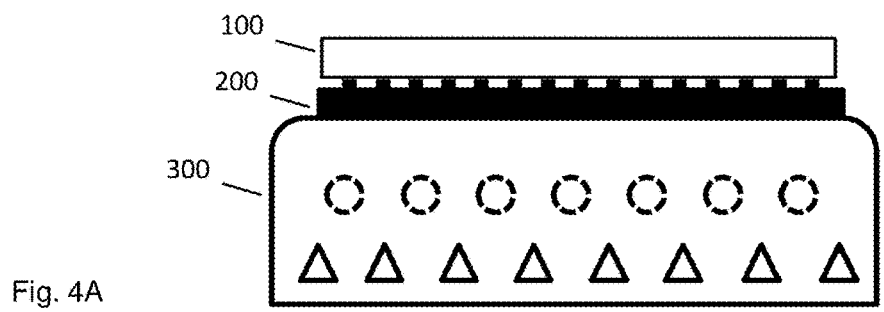
FIGS. 4A-4E illustrate different steps of an improved imprint process according to the proposed solution.

In FIG. 4A, the substrate 100 and the template 200 are shown when placed together in a sandwich arrangement onto the support element 300. While these drawings show the substrate 100 on top of the template 200, the opposite arrangement may alternatively be used in some embodiments. The support element 300 acts as a temperature-regulated heater block, provided in the imprint apparatus 20.

Figure 4B:
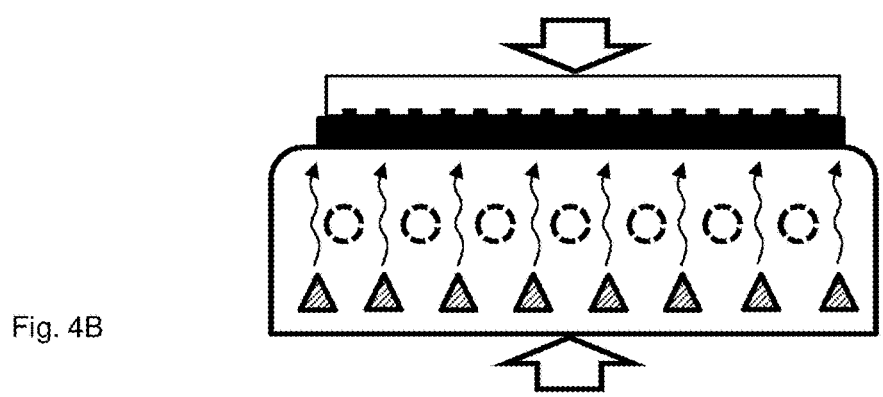

In FIG. 4B heat is applied using the heating element 320. In this process, the moldable layer of the substrate 100 may be affected to soften. In some embodiments, heat is applied to raise the temperature T in the support element 300, and in consequence the substrate 100, so as to exceed a glass transition temperature Tg of the thermoplastic polymer of the substrate 100. As indicated by the arrows in the drawing, pressure is further applied such that the structure of the patterned template surface 210 is embossed in the moldable substrate layer of the substrate 100, so as to make an imprint of the pattern.

Figure 4C:
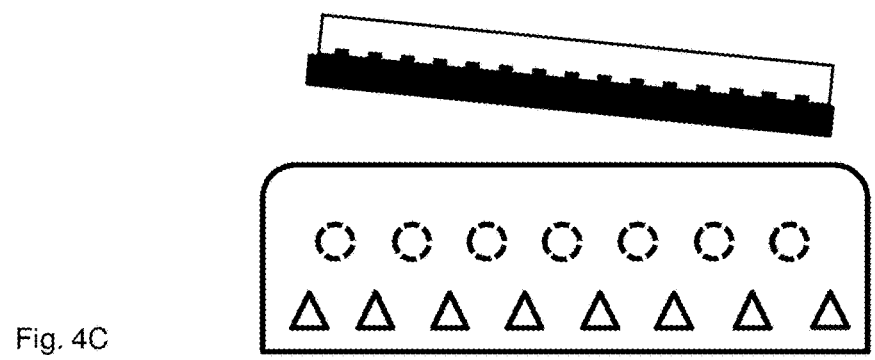

FIG. 4C illustrates that, in contrast to the method of FIG. 3, the combined substrate 100 and template 200 sandwich arrangement is removed from the support element, without or substantially without cooling, thus holding a raised temperature T>Tg.

Figure 4D:
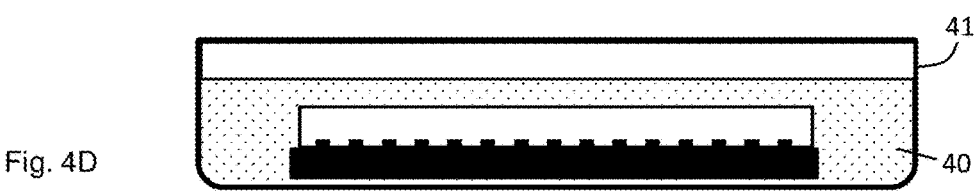

FIG. 4D further illustrates that instead of cooling the sandwich arrangement by means of the support element 300, the combined substrate 100 and template 200 are subsequently subjected to a cooling environment, preferably a liquid bath provided by a cooling liquid 40 in a vessel 41, which holds a temperature T<Tg. This creates a substantially instantaneous cooling step, by quenching the thermoplastic polymer of the substrate 100 along with the template 200 in the medium 40 held at a temperature lower than the glass transition temperature Tg of the polymer.

Figure 4E:

FIG. 4E illustrates that, after removing the combined substrate 100 and template 200 from the liquid bath, the imprinted substrate 100 is dismembered from the template 200. This may e.g. be carried out by means of a peeling process. The patterned substrate 100 can subsequently be used as a new template in a second pattern transfer process, or e.g. for forming components onto the substrate 100.

The invention as defined by these steps provides improved process efficiency. One technical effect is that the cooling step is shortened. Moreover, the process is simplified since no cooling arrangement in the imprint apparatus is required or needs controlling.

Figure 5:
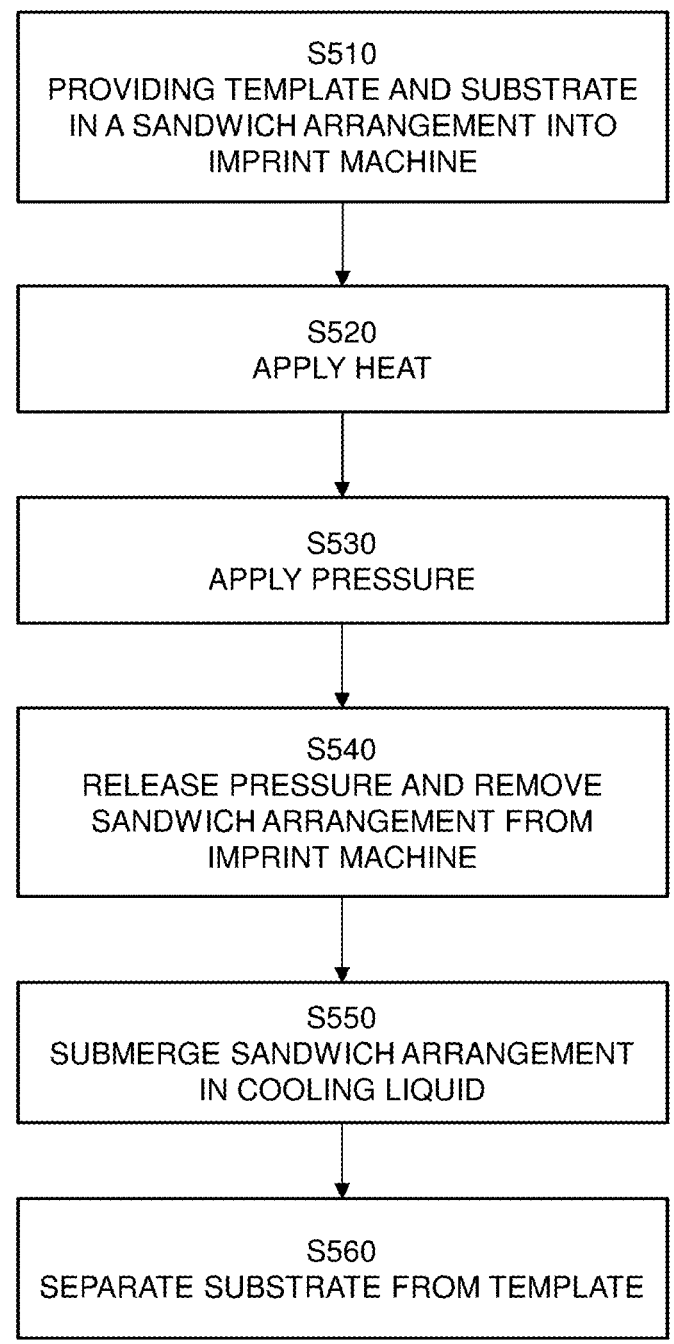
FIG. 5 shows a flowchart of various steps included in the proposed method.

FIG. 5 shows a flowchart comprising various process steps of a method for transferring a pattern of a structured surface 210 of a template 200 onto a target surface 110 of a substrate 100.

In step S510, the template 200 and the substrate 100 are provided in a sandwich arrangement with the structured 210 surface in contact with the target surface 110, into an imprint machine 20.

In step S520, heat is applied to soften a molding layer 100, 120 on the substrate surface 110. The target temperature is typically dependent on the material of the moldable layer of the target surface 110.

In step S530, the sandwich arrangement is pressed together to imprint the pattern into the heated molding layer.

In step S540, the pressure is released upon which the sandwich structure is removed from the imprint position of the imprint machine. This may be carried out by an automatic discharge mechanism, or potentially manually. Heating of the support element 300 may also be terminated, e.g. just before or in conjunction with pressure release.

In step S550, the sandwich arrangement is subjected to a cooling liquid, such as by being submerged into a liquid bath, to harden the molding layer of the substrate 100.

In step S560, the sandwich structure is dismantled so as to separate the template 200 from the now patterned substrate 100. This step may be carried out after first removing the sandwich structure from the liquid bath.

The process described above provides a number of features that may be specifically arranged in different ways in different embodiments. Different features of such variety of embodiments are outlined below. It shall be noted that, except where contradictory, the features of these embodiments may be combined in any manner.

In some embodiments, the molding layer comprises a thermoplastic polymer. In various embodiments, the moldable layer 120 of the substrate may be formed of a material selected from polymethylmethacrylate (PMMA), cyclic olefin copolymer (COC), polycarbonate (PC), polyester terephthalate (PET), polystyrene (PS), polyvinyl alcohol (PVA), polypropylene (PP) or other.

In some embodiments, the substrate 100 is entirely formed of a thermoplastic polymer, which forms the moldable layer 120. The material of the substrate may e.g. be one of PC, PMMA, COC polymer, PS, or PP.

In some embodiments, the molding layer 120 is a coating provided on a substrate carrier element 130, formed of a different material than said molding layer 120. In various embodiments, the carrier may be formed of one, or a combination, of metal, Silicon, Quartz, and polymers capable of withstanding Tg of the functional material of the molding layer 120. In yet another example, the substrate 100 may be formed of a composite material, e.g. reinforced plastics such as glass reinforced PP, wherein the composite material comprises a thermoplastic material.

In some embodiments, the step of applying heat comprises heating the sandwich structure to a temperature T1 which exceeds a glass transition temperature Tg of the thermoplastic polymer. In certain embodiments, the thermoplastic polymer may be a crystalline thermoplastic. In such embodiments, the step of applying heat may comprise heating the sandwich structure to a temperature T1 which exceeds a melting point of the crystalline thermoplastics.

In various embodiments, the cooling liquid 40 holds a temperature T2 which is lower than $T_g$, and wherein the step of submerging is carried out when the sandwich structure holds a temperature exceeding Tg.

In various embodiments, the cooling liquid comprises one or more components selected from water, alcohols, toluene, solvents like acetone, etc.

EXAMPLES

A number of examples of the proposed method will now be provided, in which more specific details are outlined for various aspects.

In a first example, imprint is carried out using a nickel template 200 having a surface 219 which exhibits a BluRay pattern having structure heights in the range of 100 nm and widths in the range of 150 nm. The pattern is imprinted into substrate 100 in the form of a Zeonor ZF14 foil, which is a COC (Cyclo-olefin Coploymer) from ZEOn Chemicals, at 150° C. at 50 bar for 3 min in an imprint machine 20. The Zeonor foil along with the Ni template was unloaded from the imprint machine 20 and immersed into a bath of water at about room temperature of 15-25° C., such as 19° C. The cooling to well below a glass transition temperature $T_g$ is substantially instantaneous, and occurs with a few milliseconds. In various embodiments, the sandwiched template and substrate may be maintained in the bath for a time which is sufficient, given the water temperature, such as at least 3 in the present example. The substrate 100 was thereafter dismembered from the template 200.

In a second example, a Silicon template 200 with nano-patterned pillars with diameter of 340 nm and depth of 470 nm has been imprinted into a PC (Markofol foils) substrate 100 at 170° C. at 35 bar for 5 minutes. The imprint was then cooled to 160° C., using a cooling element 320 in the support element 300. The purpose of this pre-cooling stage is to bring the sandwich structure, comprising the template and the substrate, closer to the $T_g$ of the PC (about 145° C.) before quenching. This may be particularly beneficial for finer patterns, such as the patterns transferred in this example, and serves to avoid a distortion in the structures which may be caused by quenching from higher temperatures. After that pre-cooling stage, the sandwich structure comprising the PC substrate 100 along with the silicon template 200 was unloaded from the imprint machine and immersed into a bath of 15% by volume iso-propyl alcohol (IPA) in water at a temperature of 90° C. Again, this is a pattern specific solution. For the grating structures, the cooling is substantially instantaneous, yet only from 160 C-90 C. Lower bath temperatures could risk distorting the structures. The substrate 100 was thereafter dismembered from the template 200.

In a third example, the substrate comprises a quartz substrate carrier 130. The quartz carrier 130 was spin coated with mr-I PMMA (Microresist GmbH) to form a moldable layer 120. A Ni template 200 whose surface exhibits a line pattern having a width of 80 nm and a height of 90 nm has been used to imprint the pattern into the PMMA coated substrate 100. The Ni surface was pre-treated to obtain a low surface energy, preferably less than 18 mN/m. The imprint was performed at 165° C. for 5 min. The sandwich arrangement including the template 200 and PMMA coated quartz substrate 100 were removed from the imprint machine and immersed into a bath of 5% by volume acetone mixed with water at 5° C. The substantially instant cooling only requires a few milliseconds, however the act of dropping it and removing from the solution may be carried out in about 3-5 seconds in total. Acetone has low boiling point, hence an arbitrary value much below room temperature was chosen for the experiment. Also the functional layer of PMMA could be cooled through the Quartz carrier and hence a temperature much below RT may be used. The substrate 100 was thereafter dismembered from the template 200.

A typical process outline according to the state of the art may comprise the following steps:
1. Application of IPS foil on master below Tg
2. Heating of sandwich above Tg under pressure—60-120
3. Process time—180-300 secs
4. Controlled cooling to a demold temperature—60-600 secs (depending on pattern and air/water used to cool)
5. Manual mold release—30 sec With e solution as proposed herein, the corresponding process may comprise the following steps:
1. Application of IPS foil directly above Tg
2. Process Time—180-300 sec
3. Quenching in bath—3-5 secs (in most cases mold separation happens during quenching)

In essence, time saved could vary from 120-720 secs per process. One of the reasons for this is that there is only one required step of heating up over the glass transition temperature of the system since cooling is carried out after the sandwich structure is removed from the imprint machine. This means there is no required cyclic heating and cooling between successive imprint steps.

The cooling liquid composition used in the bath for quenching may in various embodiments comprise water. In some embodiments, a solvent is added, having a lower boiling point than water, such as acetone or IPA. The solvent may be added to a composition of 5-10% of weight. The use of such a solvent may be beneficial when the substrate is comparatively thick, and a higher thermal energy needs to be extracted in the instant cooling.

The invention claimed is:

1. Method for facilitating demolding of a substrate from an imprint template, the method comprising: providing the template and the substrate in a sandwich arrangement with a structured surface of the template in contact with a target surface of the substrate; applying heat to soften a molding layer on the target surface, wherein said molding layer is a thermoplastic material having a minimum glass transition temperature, $T_g$>50° C. and Young's modulus>1000 MPa, and wherein the molding layer is heated above $T_g$; pressing the sandwich arrangement together to imprint a pattern of the structured surface into the heated molding layer; submerging the sandwich arrangement in a cooling liquid to harden the molding layer; and separating the template from the patterned substrate, wherein the cooling liquid comprises 10-20% by volume iso-propyl alcohol (IPA) in water and holds a temperature (T2) of 80-100° C.

2. The method of claim 1, wherein the molding layer comprises a thermoplastic polymer.

3. The method of claim 2, wherein the molding layer is a coating provided on the substrate, wherein the substrate further comprises a carrier element formed of a different material than said molding layer.

4. The method of claim 1, wherein the substrate is entirely formed of a thermoplastic polymer.

5. The method of claim 1, wherein the pressing is carried out by applying a pressure not exceeding 5 MPa.

6. The method of claim 1, wherein the cooling liquid has a specific heat capacity (c) of <4191 Jkg$\hat{\,}$K$^1$.

7. The method of claim 6, wherein the cooling liquid holds a temperature (T2) which is lower than $T_g$, and wherein the step of submerging is carried out when the sandwich structure holds a temperature exceeding $T_g$.

8. The method of claim 1, wherein the molding layer is formed of cyclic olefin copolymer, COC.

9. The method of claim 1, wherein the molding layer is formed of polycarbonate, PC.

10. The method of claim 1, wherein the molding layer is formed of polymethylmethacrylate, PMMA.

11. The method of claim 1, wherein the molding layer is formed of polyester terephthalate, PET.

12. The method of claim 1, wherein the molding layer is formed of polystyrene, PS.

13. Method for facilitating demolding of a substrate from an imprint template, the method comprising: providing the template and the substrate in a sandwich arrangement with a structured surface of the template in contact with a target surface of the substrate; applying heat to soften a molding layer on the target surface, wherein said molding layer is a thermoplastic material having a minimum glass transition temperature, $T_g$>50° C. and Young's modulus>1000 MPa, and wherein the molding layer is heated above $T_g$; pressing the sandwich arrangement together to imprint a pattern of the structured surface into the heated molding layer; submerging the sandwich arrangement in a cooling liquid to harden the molding layer; and separating the template from the patterned substrate wherein the cooling liquid comprises 1-10% by volume acetone in with water at 0-10° C.

14. The method of claim 13, wherein the molding layer comprises a thermoplastic polymer.

15. The method of claim 14, wherein the molding layer is a coating provided on the substrate, wherein the substrate further comprises a carrier element formed of a different material than said molding layer.

16. The method of claim 13, wherein the substrate is entirely formed of a thermoplastic polymer.

17. The method of claim 13, wherein the pressing is carried out by applying a pressure not exceeding 5 MPa.

18. The method of claim 13, wherein the cooling liquid has a specific heat capacity (c) of <4191 Jkg^K$^1$.

19. The method of claim 18, wherein the cooling liquid holds a temperature (T2) which is lower than $T_g$, and wherein the step of submerging is carried out when the sandwich structure holds a temperature exceeding $T_g$.

20. The method of claim 13, wherein the molding layer is formed of cyclic olefin copolymer (COC), polycarbonate (PC), polymethylmethacrylate (PMMA), polyester terephthalate (PET), or polystyrene (PS).

* * * * *